US007830549B2

(12) United States Patent
Huber et al.

(10) Patent No.: US 7,830,549 B2
(45) Date of Patent: Nov. 9, 2010

(54) METHOD FOR THE IDENTIFICATION OF COLOR MEASURING STRIPS

(75) Inventors: Werner Huber, Wiesloch (DE); Harald Bucher, Eschelbronn (DE); Michael Steinle, Waghäusel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 917 days.

(21) Appl. No.: 11/714,494

(22) Filed: Mar. 6, 2007

(65) Prior Publication Data

US 2007/0209542 A1 Sep. 13, 2007

(30) Foreign Application Priority Data

Mar. 6, 2006 (DE) ...................... 10 2006 010 127

(51) Int. Cl.
*G01N 21/25* (2006.01)
*G01N 21/86* (2006.01)
*G06F 15/00* (2006.01)

(52) U.S. Cl. ........................ 358/1.9; 358/504; 356/406; 250/559.01; 250/559.39

(58) Field of Classification Search .................. 358/1.9, 358/504, 402, 406; 250/559.01, 559.39
See application file for complete search history.

(56) References Cited

U.S. PATENT DOCUMENTS

| | | | | |
|---|---|---|---|---|
| 4,505,589 | A * | 3/1985 | Ott et al. | 356/402 |
| 4,648,048 | A * | 3/1987 | Dorn et al. | 250/559.37 |
| 5,751,450 | A | 5/1998 | Robinson | |
| 6,901,163 | B1 | 5/2005 | Pearce et al. | |

FOREIGN PATENT DOCUMENTS

| | | | |
|---|---|---|---|
| DE | 36 14 092 | C2 | 10/1987 |
| DE | 39 22 176 | A1 | 1/1991 |
| EP | 1 080 348 | B1 | 8/2002 |
| WO | WO 97/44950 | | 11/1997 |

* cited by examiner

*Primary Examiner*—Kimberly A Williams
(74) *Attorney, Agent, or Firm*—Laurence A. Greenberg; Werner H. Stemer; Ralph E. Locher

(57) ABSTRACT

To perform a method for identifying color measuring strips having measuring areas on printed products, the color measuring strips are scanned with a color measuring instrument. The measured color values acquired by the color measuring instrument are stored in a computer and that the measured color values acquired are each assigned to a printing ink. A sequence formed in this way of printing inks is stored in the computer and then compared with color measuring strip types stored in the computer. The stored color measuring strip type having the greatest probability is then selected.

10 Claims, 4 Drawing Sheets

| fms | CMY | B | C | M | Y | B70 | C70 | CMY | B | C | M | Y | M70 | CMY | B |
|---|---|---|---|---|---|---|---|---|---|---|---|---|---|---|---|
| Pos | 1 | 2 | 3 | 4 | 5 | 6 | 7 | 8 | 9 | 10 | 11 | 12 | 13 | 14 | 15 |
| | | | | | | | | | | | | | | | |
| dna | B | B | C | N | T | B | C | B | B | C | M | Y | M | B | B |
| 1 lst | M | Y | B | C | B | B | C | M | Y | M | | | | | |
| 2 lst | | M | Y | B | C | B | B | C | M | Y | M | | | | |
| 3 lst | | | M | Y | B | C | B | B | C | M | Y | M | | | |
| 4 lst | | | | M | Y | B | C | B | B | C | M | Y | M | | |
| 5 lst | | | | | M | Y | B | C | B | B | C | M | Y | M | |
| 6 lst | | | | | | M | Y | B | C | B | B | C | M | Y | M |

FIG. 4

METHOD FOR THE IDENTIFICATION OF COLOR MEASURING STRIPS

CROSS-REFERENCE TO RELATED APPLICATION

This application claims the priority, under 35 U.S.C. §119, of German application DE 10 2006 010 127.8, filed Mar. 6, 2006; the prior application is herewith incorporated by reference in its entirety.

BACKGROUND OF THE INVENTION

Field of the Invention

The invention relates to a method for identifying color measuring strips having color measuring areas on printed products, the color measuring strips are scanned with a color measuring instrument.

For the assessment of the print quality of products produced by offset printing, the color fidelity is primarily of critical importance. Color fidelity is in this case understood to mean the most exact reproduction possible of the printing original from a color point of view. In order to be able to check the reproduction on the finished print, a control strip, which contains various measuring areas, is normally also printed in the printing press beside the actual printed image. The control strip can be read by an appropriate measuring instrument, either inside or outside the printing press. The measured values determined in this way permit exact comparison with measured values stored from the printing original and in this way permit any deviations from the original to be detected. The deviations detected can be supplied to a control loop, which controls the color control in the inking units of the printing press and counteracts the deviations. The control strips printed on normally have a plurality of colored areas in the printing inks used in each case. Typically, there are at least colored areas in the colors yellow, magenta, cyan and black. In addition, the color measuring strips often also contain gray-stage areas, so that these graduations can also be measured.

There are automatic measuring instruments which move over a printed sheet which lies on a measuring table and which evaluate the color measuring strips present on the printed sheet. In order to permit reliable evaluation of the color measuring strips, however, the color measuring strip used in each case must be known to the measuring instrument. There are a large number of color measuring strips, it also being possible for these to be modified by the user. One possible way of notifying the measuring instrument about a color measuring strip used is by entering the color measuring strip type used in each case by hand. However, this is very complicated, since here the user first has to enter all the areas of the color measuring strip into the control system of the measuring instrument. Attempts have therefore already been made in the past to permit the most highly automated acquisition of the color measuring strip type used. Published, European patent application 0 064 024 A1 discloses an apparatus for scanning color measuring strips whose structure does not have to be known in advance in the scanning device. For this purpose, first what is known as a recognition run is carried out, during which the color measuring strip is analyzed. In addition, individual measuring positions of the scanning device on the color measuring strip are stored. In this case, specific regions of the color density variation are taken into account as the measuring position. It has been established that, within the individual color measuring areas, the color variations are rather flat while, at the transitions between the individual measuring areas, there are relatively steep flanks. The measured values are used to compare the measuring strip to be analyzed with measuring strips which are known to the scanning device. In the case of an unknown measuring strip, the scanning device needs certain information about the types of measuring area which occur, however, which has to be entered before the recognition run. The apparatus therefore also has the disadvantage that, in the case of an unknown type of measuring strip, an entry of measuring areas by hand is necessary.

SUMMARY OF THE INVENTION

It is accordingly an object of the invention to provide a method for the identification of color measuring strips which overcomes the above-mentioned disadvantages of the prior art methods of this general type, which manages without supplementary entries by the operating personnel.

The method according to the invention is suitable in particular for use in automatic measuring instruments which register the surface of a printed product by a scanner or by measuring heads and, in the process, carry out measurements continuously or at short intervals and are thus able to measure the surface of the printed product densitometrically or colorimetrically. Using such measuring instruments, the color measuring strips applied beside the printed image can also be registered. In this way, individual measuring areas of the color measuring strip can be determined, so that they can be supplied to a computer. In the computer, the measured color values acquired are stored, the measured color values acquired in each case are assigned to a printing ink. If four different colors are used in the offset printing press, then the measured color values acquired are assigned to exactly these four printing inks. This is of course all the more difficult the more the printed product deviates from the original, since here, in the extreme case, individual measured color values can lie in a region which makes an unambiguous assignment to a specific printing ink impossible. Following the assignment of the measured color values acquired to a specific printing ink, a sequence of printing inks is produced, which is likewise stored in the computer. The computer can be integrated into the color measuring instrument but it is also possible for the measured color values determined by the measuring instrument to be fed first to a separate computer or else to the printing press computer, which performs the assignment of the measured color values to the printing inks.

In the computer, all the known color measuring strip types are also stored, so that is possible to carry out a comparison with the determined sequence of stored printing inks and the stored color measuring strip type. Following the comparison of the determined sequence and the stored color measuring strip types, one or more color measuring strip types having the greatest probability are selected. Should only one color measuring strip type be left, then this can also he selected automatically by the computer and detected as correct. Should a plurality of color measuring strip types have been detected with the same probability, then the selection of the actual color measuring strip type can be left to the user. In both cases, however, it is not necessary for the user to have to enter any sort of color measuring strip types or measuring areas into the computer himself, as is required in the prior art if unknown color measuring strip types are used.

In a first refinement of the invention, provision is made for the color measuring instrument to have a support table for printed products and for the measured color values to be provided by scanning the printed products by a movable motor-driven scanner. Such an apparatus is connected to the computer, so that the measured color values acquired automatically can be passed directly on to the computer. The user merely has to place the finished printed product on the support table and trigger the measuring operation via a pushbutton or another entry device. The scanner then moves independently and automatically to the measuring points on the printed product, so that here no help from the user is needed. The color measuring instrument can scan both the printed image and the color measuring strip applied at the side.

In a further refinement of the invention, provision is made for the assignment of an acquired measured color value to a printing ink to be carried out by a vector calculation in a color space. For the functioning of the invention, correct assignment of the acquired measured color values to the printing inks used in the printing press is imperative. In order to be able to carry out the assignment of the color measuring areas to the printing inks as far as possible without error, the acquired measured color values are represented as vectors in an associated color space. Thus, each measured color value is given a color vector stored in the computer. In this case, all color spaces can be used, for example the CIE Lab color space. The acquired measured color values and their associated color vectors are then assigned to color vectors covering the respective color space, by the difference of the color vector of the measured color value from the color vectors covering the color space being calculated. After the individual differences of the vectors of the measured color value from the color vectors of the color space have been calculated, the measured color value is assigned to that printing ink from which it has the smallest difference, the projection of the measured color value onto the color vectors of the color space basically having to point in the same direction as these color vectors themselves. The result is then a sequence of printing inks of the color space used, which are each assigned to the acquired measured color values. These printing inks are reproduced in the stored color measuring strip types.

According to the invention, provision is further made for the sequence of printing inks in each case to be displaced by one colored area during the comparison with the color measuring strip type stored in the computer. The color measuring strips used on the printed sheet are often composed of a plurality of color measuring strips, or abbreviations are made at one or the other end. However, this changes nothing in the basic sequence of the measuring areas in the respective color measuring strip type. In order to be able to find the color measuring strip type with the greatest probability, according to the present invention, the determined sequence of printing inks is then in each case displaced by one measuring area with respect to the stored color measuring strips, in each case the agreements between the individual color measuring areas of a stored color measuring strip type and the determined sequence of printing inks being stored in the computer. If there are n measuring areas, then a displacement of the determined sequence of printing inks is carried out n−1 times, so that all the possibilities and agreements with stored color measuring strip types can be recorded. The stored agreements are arranged in the manner of a table by the computer at the end of the comparison operation, the most agreements being at the top. In the ideal case, there is one color measuring strip type which has the most agreements as the only one, which can then be selected automatically by the computer.

It is further advantageous if the color measuring strip type determined by the computer is displayed on a monitor. In this case, the user is provided with the possibility of using his own eyes to compare the result determined by the computer with the color measuring strip present on the printed sheet. Should deviations arise here, then the user can discard the result from the computer and, if appropriate, select another stored color measuring strip type which has somewhat fewer agreements with the determined sequence of printing inks. The display on the monitor is particularly expedient when color measuring strips with an equal number of agreements have been determined. In this case, the user can select the associated correct type after a glance at the color measuring strip actually present on the printed sheet. However, in this case the user does not himself have to enter color measuring areas either or even set up color measuring strip types. He merely has to make a small selection from the stored color measuring strip types.

Furthermore, it proves to be advantageous that the only measured color areas which are processed are those during whose measurements only a single measuring area of the color measuring strip is registered. There are color measuring instruments which scan the surface of a printed sheet continuously and therefore also determine measured values at the change from one color measuring area to an adjacent color measuring area. These measured values necessarily include the color components from two measuring areas, so that an unambiguous assignment of these measured values to a color measuring area is made more difficult or is impossible. Since such measured values falsify the result, there is the danger here that an assignment of color measured values to printing inks cannot be carried out correctly. In this case, measurements are recognized as valid only when the measurement lies completely and only in one measuring area of the color measuring strip scanned. Measured values in which such an unambiguous assignment to printing inks is made more difficult or is impossible are discarded by the computer and not processed. This considerably reduces the danger that the color measured values are not assigned correctly to the printing inks. In this case, the criterion used can be the color difference from the previous or following scan, a measurement being valid when its colorimetric difference is smaller than a practical predefined threshold. The measured values within the measuring area must then lie under this predefined threshold, while measurements on the boundary of measuring areas exceed this threshold.

Other features which are considered as characteristic for the invention are set forth in the appended claims.

Although the invention is illustrated and described herein as embodied in a method for the identification of color measuring strips, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a table showing a determination of the agreement of a determined sequence of printing inks with a stored color measuring strip type in the computer.

DESCRIPTION OF THE PREFERRED EMBODIMENTS

Figure 1:
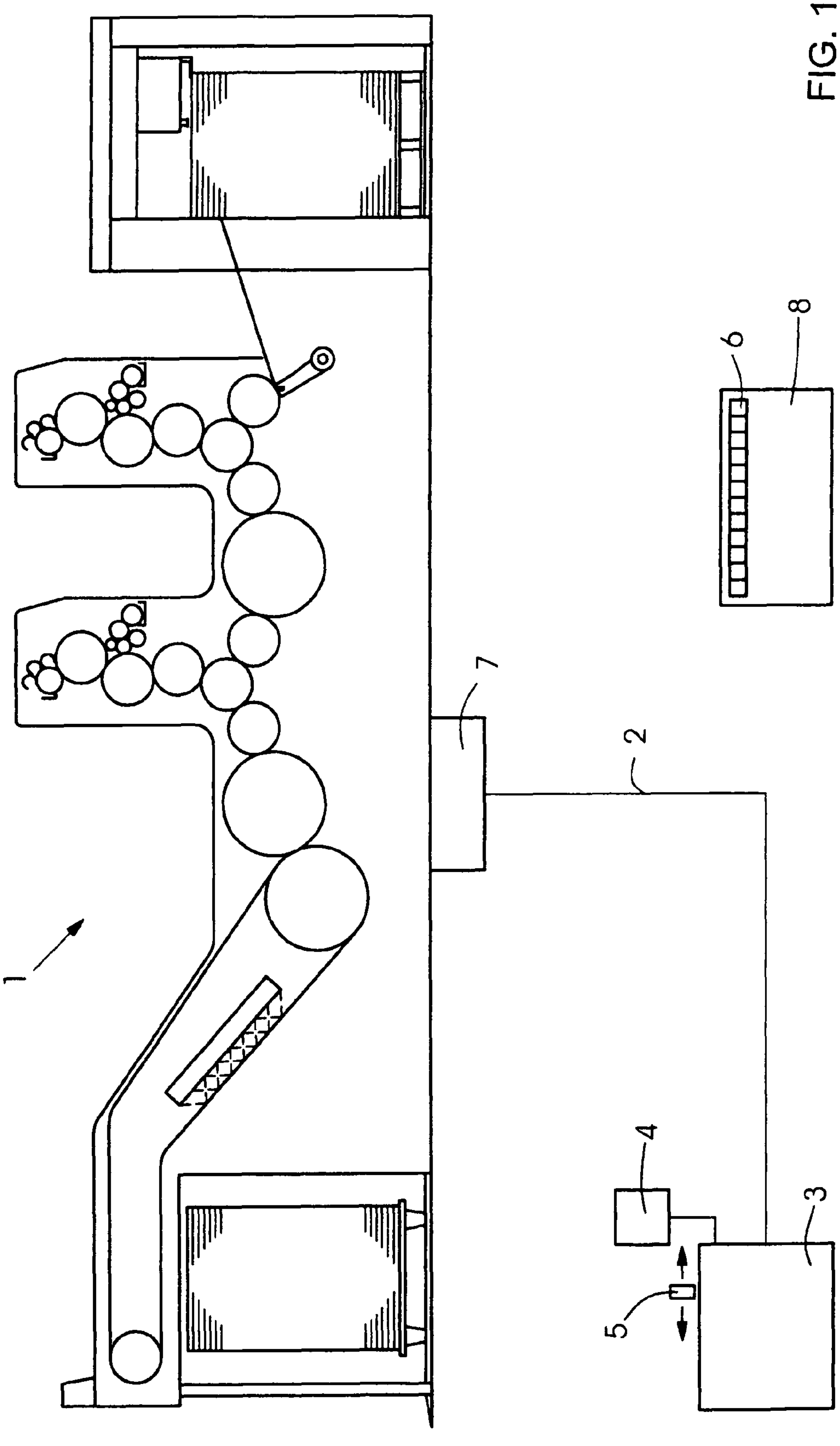
FIG. 1 is diagrammatic view of a color measuring instrument having a computer, which is connected to a printing press for color control according to the invention.

Referring now to the figures of the drawing in detail and first, particularly, to FIG. 1 thereof, there is shown a printing press 1 which is connected to a measuring device via a communications link 2. The measuring device contains a measuring table 3 for holding printing materials 8 and a scanner 5, which is connected to a computer 7 with a monitor 4. The printing materials 8 lying on the measuring table 3 have their color measured by the motor-driven scanner 5, color measuring strips 6 present beside the printed image on the sheet 8 also are registered. The acquired measured data is processed and stored either in the computer of the scanner 5 or in a computer of the printing press 1; for this purpose there is the communications link 2 between the printing press 1 and the measuring table 3. During the acquisition of the measured values, the scanner 5 travels over the color measuring strip 6 and registers one color measuring area of the color measuring strip 6 after another. By software stored in the computer 7 of the scanner 5, it is possible to register the transitions from one color measuring area to the next and to ensure that only measured values which lie completely in a color measuring area are processed. Acquired measured values which are registered beyond the boundary of color measuring areas are not taken into account in the determination of the color measuring strip type.

Figure 2:
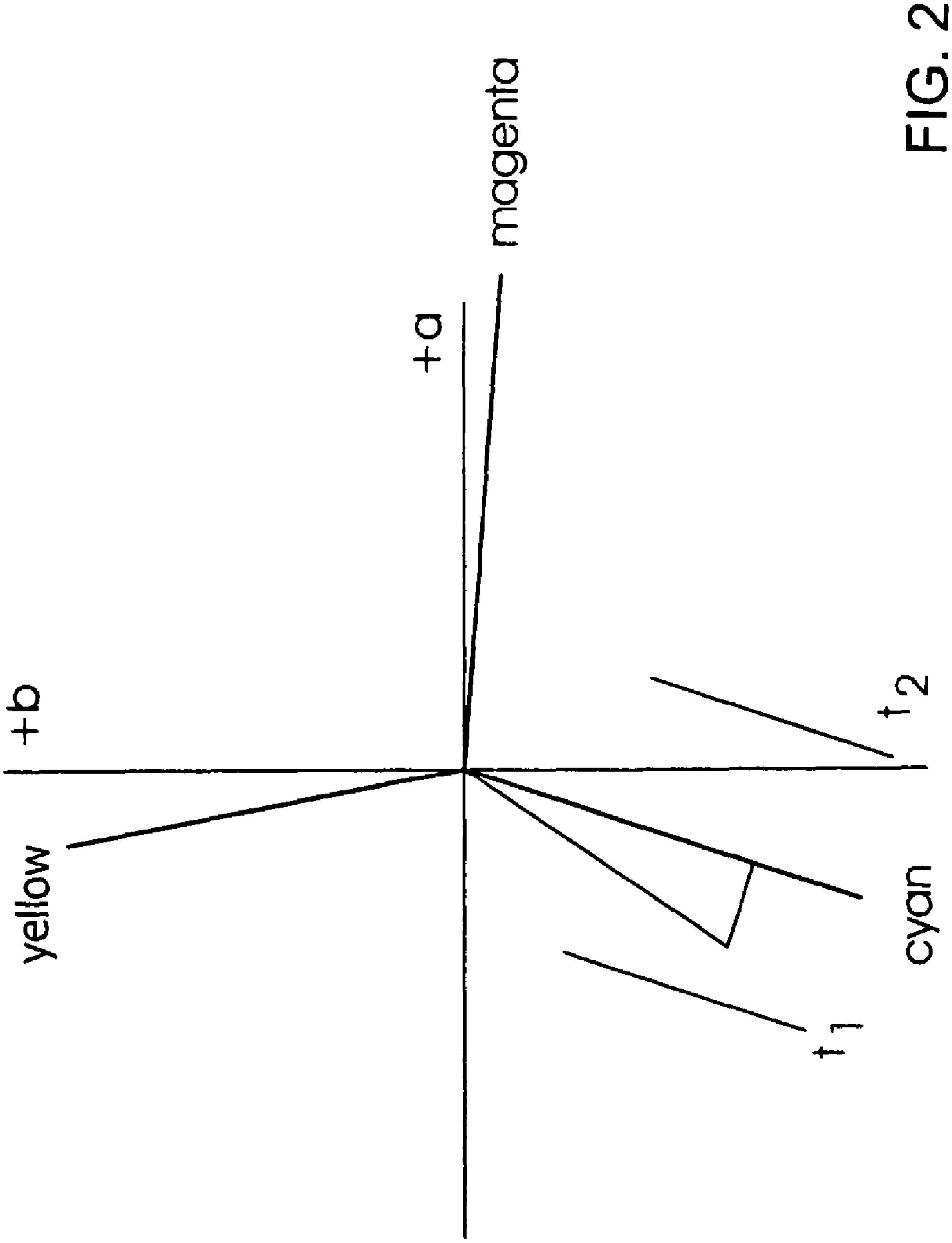
FIG. 2 is a graph showing an allocation of a color measured value as a color vector to a predefined printing ink.

FIG. 2 shows the assignment of determined measured color values to the printing inks C, M, Y, B stored in the computer. In FIG. 2, a color space in only three axes is covered, for example, the colors being represented as vectors. In the third quadrant there is the determined measured value of an acquired color. The determined color value is also represented as a vector in the color space in FIG. 2, in each case the difference of the measured color vector from the color values C, M, Y being determined in the computer. As long as the color difference is within predefined tolerance limits t1, t2, the measured color value can be assigned unambiguously to one of the printing inks C, M, Y. In FIG. 2, the measured color vector can be assigned unambiguously to the color cyan C. Should the measured color vector be located outside the tolerance bands t1, t2, it is located at the boundary between two of the printing inks C, MY; an unambiguous assignment is not possible, so that in this case the measured color vector is not taken into account. A color difference dE from one of the printing inks C, M, Y must not exceed a permissible maximum value and must lie within the tolerance limits t1, t2 since otherwise no unambiguous assignment to the printing inks C, M, Y is possible. Furthermore, the projection of the measured color values onto the printing inks C, M, Y must be positive.

Figure 3:
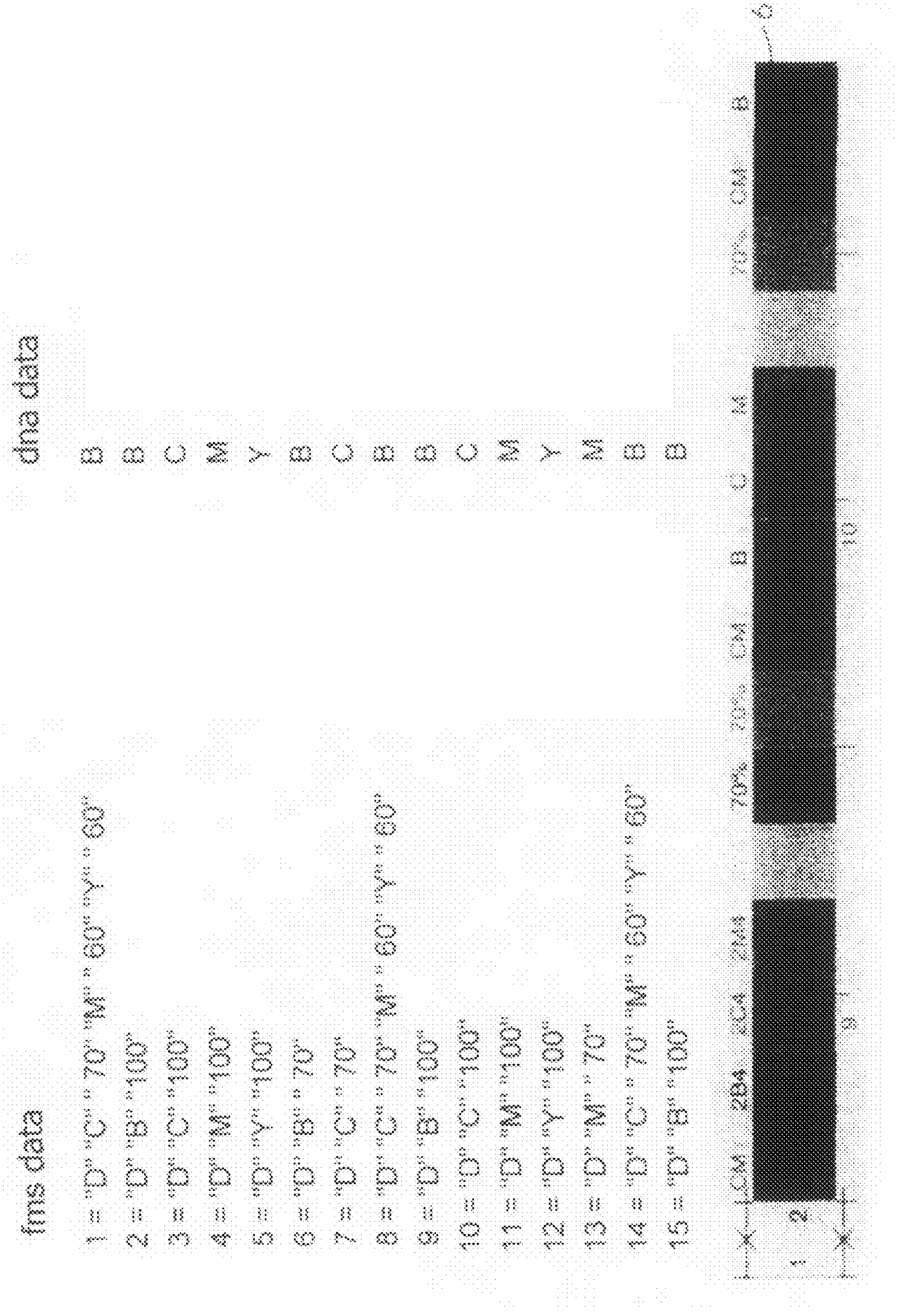
FIG. 3 is a table showing an assignment of color measuring strip data to printing ink data.

In FIG. 3, a comparison of color measuring strip data fms with the printing ink data dna in the four colors C, M, Y, B can be seen. In the left-hand half, the typical designations of the color measuring areas of a color measuring strip 6 can be seen, it being possible to see that the colors C, M, Y, B do not always have to be present as 100% tonal values but also that other values such as 60, 70% are possible. In the present method, these tonal values must also be capable of unambiguous assignment to a printing ink C, M, Y, B. Within limits, this also applies to the printing ink black B. The color measuring strip data fms depicted in the left-hand half relates to the color measuring strip 6 shown at the bottom edge of FIG. 3. It can be seen that 100% tonal values can always be assigned unambiguously to one of the printing inks C, M, Y, B. It becomes more difficult in the case of the lower tonal values. These are generally assigned to the black values B, in particular in the case of the combination of a plurality of printing inks. It can be seen that the printing ink data dna contains a sequence of the printing inks C, M, Y, B present, no distinction being drawn here between tonal values. The examples of FIGS. 2 and 3 relate to the printing press 1 in which the four colors cyan C, magenta M, yellow Y and black B are used. If further printing inks are used, then further printing ink data dna is added, which likewise has to be determined from the color measuring strip data fms by the computer 7.

The color measuring strip data fms depicted in the left-hand half of FIG. 3 is stored in the computer 7 as a file and is converted by the computer 7 to the printing ink data dna. Following this conversion, a sequence of printing ink data dna is then present in the computer 7. In order to determine the measuring strip type of the color measuring strip 6, in FIG. 4 the measured result is compared with the stored color measuring strip types in the computer 7. In the topmost line in FIG. 4, a color measuring strip type is depicted as an fms file, in each case the positions of the color measuring areas being illustrated in the second line. In the fifth line, the assignment of the color measuring areas of the color measuring strip fms to the printing inks C, M, Y, B is then shown as a dna file. This sequence of printing inks C, M, Y, B in the dna file is then compared with the printing inks C, M, Y, B of the measured color measuring areas assigned in FIG. 2. The sequence of printing inks C, M, Y, B of the measured color measuring areas is then displaced step by step with respect to the printing ink data dna. In the process, the number of agreements between the stored color measuring strip type and the determined sequence of printing inks C, M, Y, B is stored in the computer 7, there being an agreement only when both the printing inks C, M, Y, B and the position of the printing ink in the stored color measuring strip agree with the color measuring strip 6 to be analyzed. These agreements are illustrated in FIG. 4 as bordered areas. In FIG. 4, two agreements are determined in the first step. In the second step, two agreements also resulted, while in the third step there is only one agreement. In the fourth step, the computer 7 has determined ten agreements, while in the fifth and sixth step there are one and two agreements, respectively. At the end of the comparison operation, the computer 7 establishes that the step four with a maximum of ten agreements has the highest correlation by a long way. The computer 7 therefore then assumes that the color measuring strip type determined in the fourth step corresponds to the color measuring strip 6 actually measured.

If desired, the result determined by the computer 7 can first be displayed on the monitor 4, so that the operating personnel can still glance at the result. Following confirmation by the operating personnel by an acknowledgment pushbutton or an appropriately configured other operating element, the color measuring strip type determined is defined as the correct one. It is thus not necessary for the operating personnel themselves to make entries in relation to the color measuring strip 6 measured, since the measuring areas of the color measuring strip 6 are registered automatically by the scanner 5 and assigned to the stored color measuring strip in the computer 7. This makes it considerably easier for the operating personnel to use measuring devices. Since the color measuring strip 6 has been recognized automatically, the individual color measuring areas of the color measuring strip 6 can be evaluated colorimetrically or densitometrically and used to regulate the ink control in the printing press 1.

We claim:

1. A method for identifying color measuring strips having measuring areas on printed products, which comprises the steps of:

scanning the color measuring strips with a color measuring instrument resulting in measured color values;

storing the measured color values acquired by the color measuring instrument in a computer;

assigning each of the measured color values to a printing ink;

forming a sequence of printing inks from the measured color values;

comparing the sequence of printing inks stored in the computer with stored color measuring strip types stored in the computer; and selecting a stored color measuring strip type having a greatest probability of matching the sequence of printing inks.

2. The method according to claim 1, which further comprises providing the color measuring instrument with a support table for supporting the printed products and the measured color values are obtained by scanning the printed products using a movable motor-driven scanner as the color measuring instrument.

3. The method according to claim 1, which further comprises carrying out the assigning of each of the measured color values to the printing ink by means of a vector calculation in a color space.

4. The method according to claim 1, which further comprises displacing the sequence of printing inks in each case by one colored area during the comparing step with the color measuring strip type stored in the computer.

5. The method according to claim 4, which further comprises storing agreements between individual color measuring areas of the stored color measuring strip type and the sequence of printing inks in the computer.

6. The method according to claim 5, which further comprises selecting the color measuring strip type stored in the computer which has the most agreements with the sequence of printing inks.

7. The method according to claim 1, which further comprises:

carrying out the assigning of a measured color value to a printing ink by scanning a color separation;

projecting an actual color locus onto an associated desired color locus; and selecting a color separation exhibiting a lowest colorimetric difference.

8. The method according to claim 1, which further comprises processing only those of the measured color values, which during a measurement, only a single measuring area of the color measuring strip is registered.

9. The method according to claim 1, which further comprises displaying the stored color measuring strip type determined by the computer on a monitor.

10. The method according to claim 9, which further comprises acknowledging an acceptance for use of the stored color measuring strip type detected for color measurement by means of a user entry.

* * * * *